Patented May 19, 1942

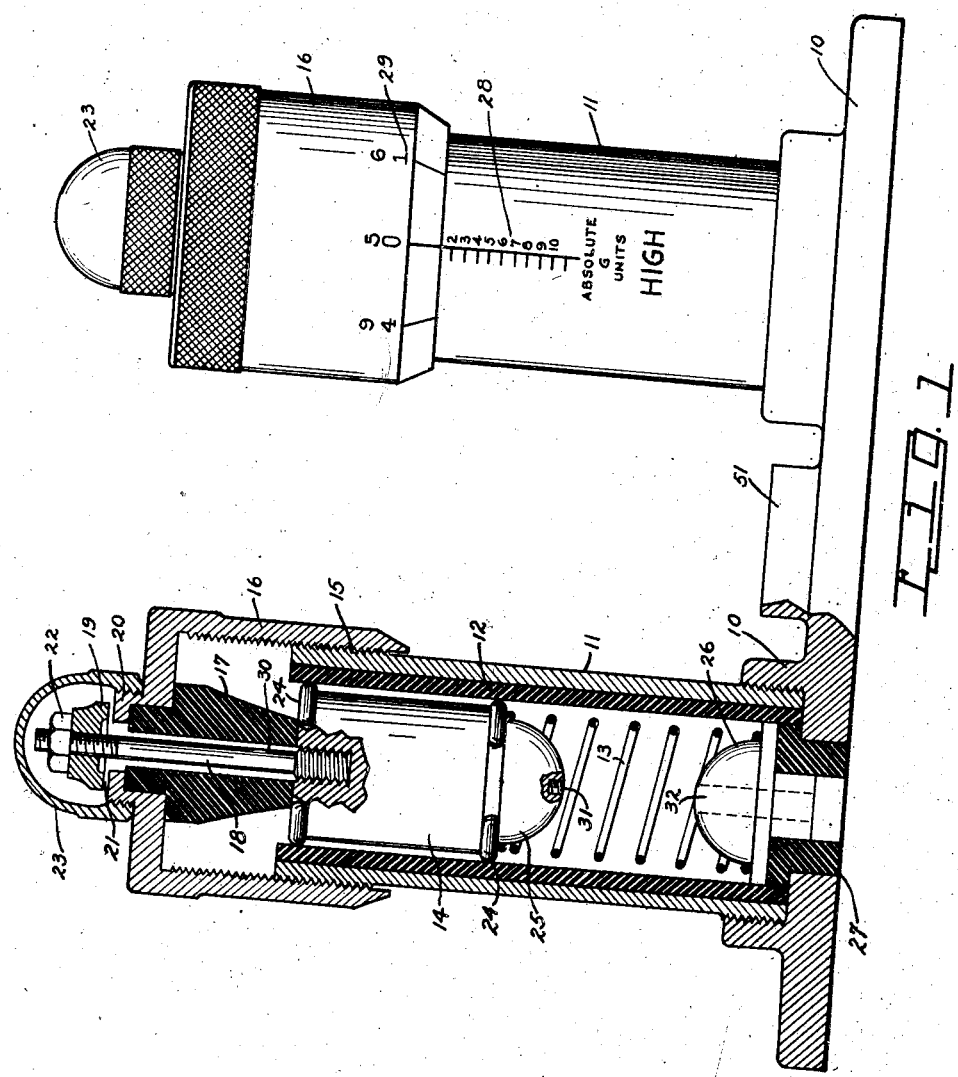

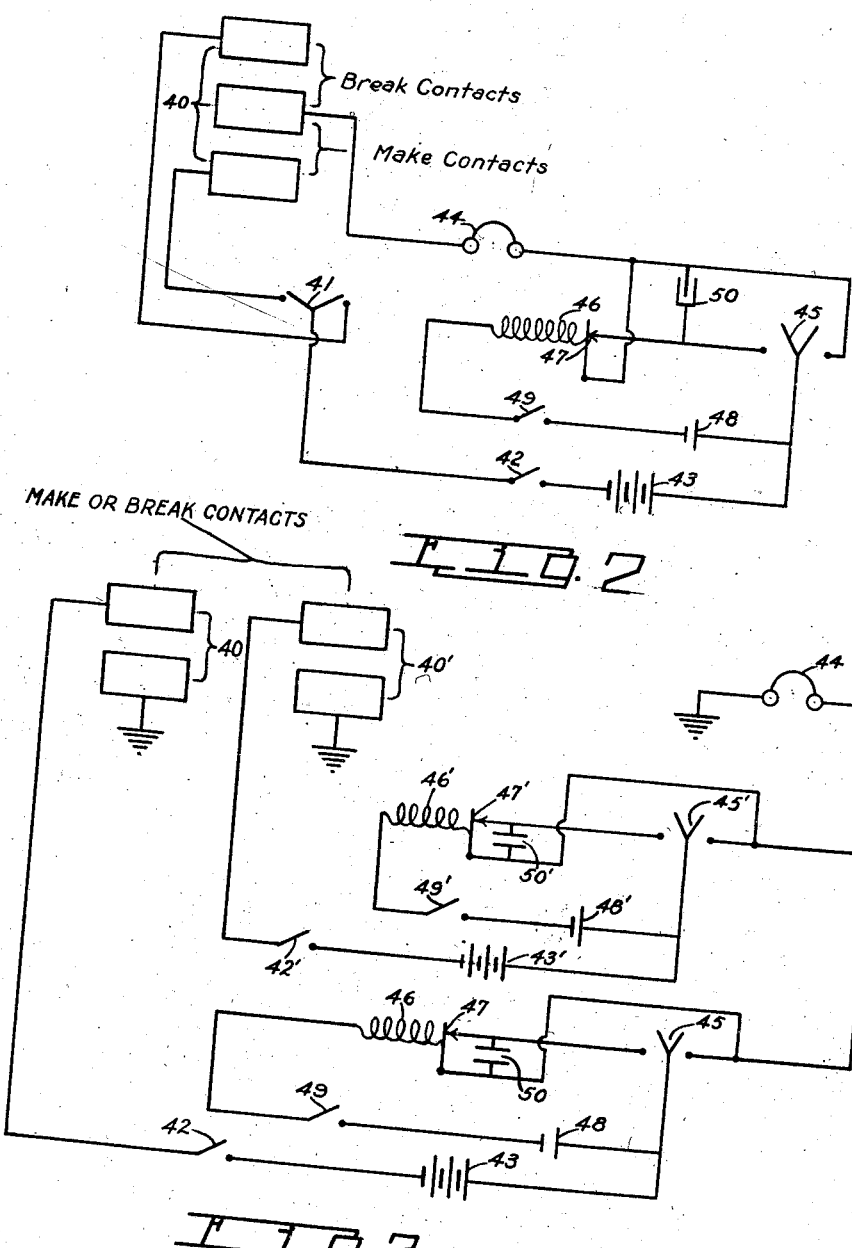

2,283,180

UNITED STATES PATENT OFFICE 2,283,180

ACCELEROMETER

James A. Buchanan, United States Navy

Application January 2, 1941, Serial No. 372,865

13 Claims. (Cl. 177—311)

(Granted under the act of March 3, 1883, as amended April 30, 1928; 370 O. G. 757)

My invention relates to new and useful improvements in accelerometers, as well as the auxiliary equipment used in connection therewith, and also relates to a new combination of such auxiliary equipment with said accelerometers.

The particular accelerometer to which this invention relates is useful generally in the field of accelerometry as applied to structural mechanics, and may be used to determine the riding or impact producing qualities of automobiles, railway coaches or the like. However, this instrument was designed primarily for use in the field of accelerometry as applied to aeronautics. Accelerometer records of an aircraft have been used for the purpose of observing and obtaining the dynamic forces acting thereon, as well as the load factor while in flight, these factors being valuable to the designer since they indicate the magnitude and duration of the stresses to which the aircraft structure is subjected. These records may also be used to give an indication of the pilot's ability, since in stunt flying and in landing the acceleration along any particular axis indicates the ability of the pilot to execute the particular stunt or landing, excessive acceleration being generally undesirable. It will later be apparent that my invention is not only useful in the same or similar manner as are the prior art accelerometers, but because of its ruggedness and simplicity of design it has and will later acquire additional uses to which the prior art accelerometers are not particularly adapted.

Accelerometers are broadly divisible into two general types or classes, namely, (1) those in which the disturbance or lack of disturbance of a predetermined force system is the criterion to establish whether a given magnitude of acceleration is or is not attained, and (2) those in which the amplitude of displacement of an acceleration-sensitive mass is the criterion used to establish the value of the maximum acceleration imposed.

The accelerometer used and designed by the National Advisory Committee for Aeronautics would fall within the latter class and consists primarily of a cantilever spring with means for recording the deflections of its free end on the surface of a moving drum. This type and the seismographic type rely upon recordings of the vibrations on a moving drum or film, and in order to obtain the actual value of acceleration the operator is required to convert, at some later time, the accelerometer indications into acceleration values. One particular advantage of the accelerometer of my invention over these prior structures is that the pilot or operator is given an immediate indication of the attainment, or the lack of attainment, of an acceleration, the magnitude of which is within predetermined limits.

My invention more specifically relates to accelerometers of the first type, or classifying accelerometers in combination with auxiliary equipment which will produce a continuous audible signal whenever a certain dynamic unbalance occurs as the result of the attainment of the predetermined magnitude of acceleration. In such accelerometers, the dynamic unbalance of the force system of the instrument permits an acceleration responsive element to move through a relatively short gap between stops or contact points. Because of this characteristic, classifying accelerometers have also been referred to as "contact accelerometers." Since the response or lack of response of such instruments to imposed accelerations may thus be associated with making or breaking contacts, they are naturally adapted to be used with an electric circuit.

The "Zahm accelerometer" belongs to this same general class, in that it is a classifying accelerometer, but this accelerometer records the acceleration attained upon a moving strip of paper by means of a number of styluses held a short distance above the paper by springs of different tension.

One of the objects of my invention is to provide an accelerometer which is easy to operate and adapted for use by inexperienced operators.

Another object is to produce a rugged accelerometer of high sensitivity and accuracy which is capable of withstanding considerable rough handling without physical derangement or loss of calibration.

Another object of my invention is to provide means for obtaining a sustained or continuously repeated audible signal when the sensitive element of a classifying accelerometer is displaced from its normal position.

Still another object of my invention is to provide a classifying accelerometer in which the particular attained acceleration may be classified according to the pitch or other distinctive characteristic of the produced signal.

A further object is to provide a classifying accelerometer wherein the movement of the sensitive element is limited to a straight line path in one direction only, so that any forces produced by the acceleration of the body to which the instrument is attached that do not have a component in the direction of the straight line movement of said element will have no effect upon the operation of said accelerometer.

Accelerometry is an art as well as a science, and acceleration determinations may be in error because of faults of manipulation as well as by faults of design and theory. The new and useful features of my invention permit more accurate and reliable determinations to be made and lessen the degree of skill required by operating personnel.

With the foregoing and other objects in view, the invention consists in the construction, combination and arrangement of parts hereinafter described and illustrated in the drawings, in which:

Fig. 1 is an elevational view of a multiple element instrument, the left-hand element being in longitudinal cross-section;

Fig. 2 is a wiring diagram for a control circuit incorporating an electrically operated interrupter; and Fig. 3 shows a wiring diagram for a plurality of the control circuits shown in Fig. 2, in combination with the "make" or "break" contacts of a plurality of classifying accelerometer elements.

Referring to the drawings, each accelerometer unit consists of a base 10 which supports the cylindrical body portion 11 of each instrument. The interior of each cylindrical body is provided with a suitable insulating material 12, preferably a hard material which has a low coefficient of friction. A compression spring 13 and an acceleration sensitive element 14 are placed within the cylindrical body, the spring being centered between the boss 25 on the element 14 and the boss 26 on the base 10. The boss 26 is also insulated from the base 10 by means of the insulating insert 27. Polished lugs 24, or other suitable anti-friction guide means, are provided on the sensitive element 14 so as to provide a full free sliding fit between the sensitive element and the substantially frictionless insulated wall 12.

The body 11 is threaded at its open end 15 to engage the internally threaded cap 16. This cap 16 is provided with an internal insulating boss or stop 17 which bears against the sensitive element 14. The sensitive element 14 has a stem 18 secured to one end thereof which projects outwardly through the open end of body 11, through the bore 30 provided in the stop 17 (constructed of suitable insulating material) and on through the cap 16. A contact button 19 and locking means 22 are secured to the outwardly projecting end of the stem 18. The cap 16 is provided with a conductive shoulder 20 which is threaded throughout a portion of its entire length to accommodate a cover 23. The end of the shoulder 20 should be specially surfaced and polished so that a good, clean, low resistance contact will be made with the under side of the contact button 19 when the sensitive element is displaced a critical amount.

After the instrument is assembled but before cap 23 is screwed in place, the clearance 21 between the button 19 and shoulder 20 is adjusted to an amount which determines the maximum displacement of the sensitive element. The cap 16 is also adjustable on the body portion 11, providing thereby a means for adjusting the spring compression and the force necessary to move the sensitive element against the action of this spring. The maximum distance determined by the adjustment of the contacts remains constant over the entire range of adjustment provided by the cap 16. The clearance between the bosses 25 and 26 is such as to limit the deflection of the spring 13 an amount determined by the safe elastic stress induced therein.

The exterior portion of the body 11 is graduated in suitable units of acceleration as shown on the scale 28. The fractional indications of the acceleration may be obtained by reference to the marks 29 on the lip of the cap 16 which are similar in this respect to the graduations of a micrometer screw. The boss 51 on the base 10 provides a convenient mounting for a detachable plug connection so that conductor wires may be led off from the base 10 which is common to all elements, and the respective base bosses 26 within each of the elements.

In the circuit diagram shown in Fig. 2 the accelerometer contacts are represented at 40. Both "make" and "break" contacts are illustrated although a single set of either may be used, as will presently be described. The make and break contacts lead to the selector switch 41 and thence through the contacts of the main switch 42 to a suitable source of power represented by the battery 43. The common or grounded side of the contacts lead to an audible signalling device represented diagrammatically by the headset 44, and thence to the power source 43 through either of two circuits dependent upon the position of the second selector switch 45.

In one position of the switch 45, i. e., when it is rotated approximately 60 degrees counterclockwise from the position shown in Fig. 2, the signal circuit is carried through an interrupting device represented by the make and break contact portion 47 of an electro-mechanical vibrator 46. When contacts 40 are closed a continuous audible signal is obtained in the headset 44, the pitch of which is dependent upon the frequency of current interruption at 47. The interrupter circuit has its own source of power 48 and control switch 49. A condenser 50 is provided across the breaker points to reduce arcing at the contacts and produce a clear audible signal in the headset 44.

In the alternate position of the switch 45, when it is rotated approximately 60 degrees clockwise from the position shown in Fig. 2, the conductors and the switch 45 form a closed conductive path to the headset 44, shunting the contacts 47 of the interrupter 46. In this position of the switch 45 an audible click is detected in the headset 44, once for each make or break of the accelerometer contacts 40. In the case of periodically changing acceleration, the magnitude of which exceeds the predetermined setting of the instrument, the frequency of the clicks or the pitch of the audible note (where the variations are sufficiently high to produce a continuous note) would indicate the period of the changing accelerations.

The device could thus be used in the determination of the period of a changing acceleration which periodically exceeds the predetermined setting of the instrument. This period of the changing acceleration could be more accurately determined merely by the addition of a suitable recording device connected in series with the headset 44. The main disadvantage of this type of control for obtaining sustained values of acceleration is that the operator may miss the audible click in the headset and would otherwise be unaware of the attainment of the preset acceleration.

Fig. 3 shows the circuit connection for two control elements operating in combination with a single headset. A separate interrupter is provided for each element having a period or frequency of interruption different from that of the interrupter provided for the other element. The same reference numerals as used in Fig. 2 indicate corresponding parts, the primed numerals indicating duplicated corresponding parts.

It is to be understood that while I have shown an electro-mechanical means for producing an audible signal, I do not intend to be limited to such means alone. My device has been used in a combination where an oscillating vacuum tube circuit is provided as the means for producing a radio signal. This is particularly advantageous, since with such radio means the signal may be transmitted to a remote observer, such as the ground crew of an airplane, for recording the accelerations.

The operation of each unit of my accelerometer is as follows:

The operator adjusts the position of cap 16 to the desired value of acceleration according to the scale 28. Cap 16 through the insulating boss 17 bears against the sensitive element 14 which, accordingly, compresses the spring 13, causing it to exert a force F against the sensitive element 14. When the element 14 is subjected to dynamic conditions which impose a component $a$ of acceleration along its axis towards the base 10, such component $a$ multiplied by the mass $m$ of the sensitive element 14 causes it to exert a force $ma$ in a direction opposite to the applied force F. As long as force $ma$ does not exceed F no relative movement takes place between the contacts 19 and 20. However, if the imposed acceleration is such that force $ma$ exceeds spring force F, then element 14 will move relatively toward base 10, causing gap 21 to close, making electrical contact between button 19 and shoulder 20. It should be noted that the unit is mounted so that the axis of the sensitive element is coincident with or parallel to the axis along which it is desired to determine the acceleration.

I find it convenient and desirable to calibrate my accelerometer in gravity or $g$ units of acceleration. The scale is absolute, i. e., zero reading indicates no acceleration whatever, and the normal acceleration of the earth's gravitational field thus corresponds to one $g$. It will thus be seen that my accelerometer automatically includes such component of gravity as may be effective along its axis at any instant. When used in an airplane in flight, the resultant load acting on the airplane in the direction of the axis of the instrument is directly determined by multiplying the indicated accelerations (in $g$ units) by the total weight of the plane. This is the term frequently defined as wing load by aircraft designers.

It will be understood that while I have shown in Fig. 1 an accelerometer which employs a pair of "make" contacts, "break" contacts could also be provided, for example, between the insulating stop 17 and the sensitive element 14, and the "breaking" of such contacts could also be employed to control the audible signal circuit.

When plural interrupters are being used with break contacts, as shown in Fig. 3, a signal of a characteristic determined by the multiple frequencies of the interrupters 47 and 47' will be continuously audible in the headset 44 as long as both "break" contacts 40 are closed, or until the acceleration to which one of the sensitive elements 14 is set to respond has been exceeded, at which time the "break" contact 40 for the element would open and the characteristic of the audible signal would be changed. The pitch of the signal would now be determined by the frequency of the remaining interrupter 47', and the change in the pitch of the signal would be detected in the headset 44 to indicate the acceleration. Any further increase in acceleration would cause the remaining break contacts 40' to open, provided the acceleration exceeds that for which the second element has been set to respond, and no signal would now be heard in the headset 44.

The break contact could be used to control the energization of the coil of a relay having normally closed contacts. The contacts of the relay would control the audible signal circuit so that the signalling device would be energized only when the break contacts were opened, and the device could thus be used to produce an audible signal only after the attained acceleration was sufficient to "break" the contacts.

When the "make" contacts are used, which is the preferred form of my invention, the switch 41 would be rotated to its counterclockwise position, the main switches 48 and 49 would also be closed, and switch 45 set in its counterclockwise position to include the interrupter contacts 47. If the imposed acceleration is insufficient to close the "make" contacts 19 and 20, there will be no audible signal in the headset, and the acceleration indicated on scale 28 has not been attained. When the imposed acceleration is sufficient to close the "make" contacts 19 and 20, an audible signal or note will be heard in headset 44, and will be sustained so long as such imposed acceleration exceeds the predetermined setting indicated at scale 28.

If two elements are used as indicated in Fig. 3, the first audible signal will indicate that the attained acceleration is between the limits set on the two elements, but if the second distinctive signal is heard the operator will know that the attained acceleration exceeds the predetermined value set on the second element. Naturally, the maximum and minimum values of the particular magnitude of acceleration can be adjusted merely by adjusting the predetermined level for each element.

The "break" contacts are not ordinarily as desirable as are the "make" contacts because when "parasitic vibrations" are present (as is frequently the case), the vibrations transmitted to the sensitive element 14 may cause a premature separation of the "break" contacts, producing a false interpretation or measurement of the basic acceleration of the apparatus under observation. Many of the prior art devices which operate on the principle here employed were unsatisfactory because of the contact chatter and false recordings produced by a break resulting from "parasitic vibrations." In the present invention the spacing of the contacts 19 and 20 may be adjusted by means of the nut 22 to eliminate the effect of these parasitic vibrations transmitted to the element 14. Once the adjustment is made, the gap 21 will remain constant for all settings of the instrument. The vibrations usually encountered require but a relatively small separation between the contacts 19 and 20 and no significant loss in accuracy will ensue.

It is to be understood that my accelerometer elements may be employed either singly, as indicated in Fig. 2, or in multiple, as indicated in Fig. 3. A single element can only classify a given acceleration magnitude as less or greater than the particular critical value to which the element has been set. A multiple element accelerometer can classify a given acceleration magnitude as lying between certain limits, such limits being determined by setting the respective individual elements for response at different acceleration magnitudes. When an element with a lower setting responds to a given acceleration and an element with a higher setting fails to respond to that same acceleration, then the magnitude of the acceleration in question lies between the limits established by the highest setting of the element which responded and the lowest setting of the element which failed to respond.

It is, of course, apparent that a distinctive signal would be produced for each of the several elements.

It is convenient to calibrate my accelerometer elements in units of gravitational acceleration $g$, although I do not restrict myself to such units only. The effective weight of the sensitive element is determined by weighing the assembly of the bob or sensitive element 14, stem 18, contact button 19 and locking means 22, and adding thereto a portion of the weight of the spring. I have found that for most practical purposes the portion of the spring that is dynamically effective is of the order of one-half of its weight. The stiffness of spring 13 is such that a deflection corresponding to the pitch of threads 15, or some conventional multiple thereof, requires a force corresponding to the effective weight of the sensitive element. This relation between effective weight of the sensitive element and spring stiffness may be conveniently checked statically by attaching calibration weights to the bob 14 when the axis of the element is plumb and observing the corresponding critical setting at scales 28, 29. For such static calibration, a convenient means for attachment of the calibration weights is provided on bob 14 as by threaded connection 31 and an opening 32 through the base of boss 26. Opening 32 may normally be sealed with a plug or other convenient closure means, not shown.

It will be noted that my accelerometer is unusually rugged and rigid, that it is not liable to damage due to ordinary manipulation and handling, that its vital elements are entirely protected and enclosed, and that it may be used by any person capable of reading a micrometer. Each element is symmetrical about its longitudinal axis, which is conducive to a higher degree of mechanical perfection in its construction, since the fabrication of all parts may be executed on a lathe. The sustained audible signal feature of my invention is an important feature, and materially contributes to more certain determinations and a higher degree of precision by its use.

Other modifications and changes in the proportions and arrangement of the parts may be made by those skilled in the art without departing from the nature of this invention, within the scope of what is hereinafter claimed.

The invention described herein may be manufactured and/or used by or for the Government of the United States of America for governmental purposes without the payment of any royalties thereon or therefor.

I claim:

1. An apparatus for determining the maximum and minimum limits of an attained magnitude of acceleration comprising a plurality of inertia actuated elements each movable in response to a different predetermined magnitude of acceleration, a circuit controlling means for each of said elements responsive to a critical movement thereof, an electromagnetically actuated means for producing a sustained audible signal of a pitch determined by the frequency of the current pulsations actuating said means, a plurality of circuit interrupters, one for each of said circuit controlling means, each having a different operating frequency, a source of current supply, means connecting the source to said sound producing means through each of said circuit controlling means and the contacts of its respective circuit interrupter so that through the use of a plurality of elements the acceleration may be classified according to the pitch of the audible signal.

2. A classifying accelerometer comprising a plurality of acceleration sensitive elements, yieldable means for each element permitting said element to move a critical distance in response to a predetermined attained acceleration, means for adjusting the yieldable means so that each sensitive element will respond to a different magnitude of acceleration, circuit controlling means for each element responsive to the critical movement thereof, a plurality of circuit interrupting means, one for each circuit controlling means, having different operating frequencies, a source of power supply and an electromagnetic means for producing a sustained audible signal of a pitch equivalent to the frequency of the actuating current, said electromagnetic means being connected to the supply source through the contacts of each interrupter in series with the circuit controlling means of each sensitive element, so that through the use of a plurality of elements the attained acceleration may be classified according to the pitch of the audible signal.

3. A classifying accelerometer comprising a first inertia actuated element movable in response to a predetermined acceleration of a given magnitude, a second inertia actuated element movable in response to a predetermined acceleration of a greater magnitude, electromagnetically actuated means for producing a sustained audible signal of a pitch equivalent to the frequency of the supply current, a plurality of current interrupting means each having a different operating frequency, a power supply source, and a circuit controlling means, one for each sensitive element, responsive to the movement thereof to connect said power supply source to said sound reproducing device through said current interrupting means, so that through the use of a plurality of elements the magnitude of the attained acceleration may be classified according to the pitch of the audible signal.

4. An apparatus for determining the maximum and minimum limits of an attained magnitude of acceleration comprising a plurality of movable inertia members, means for yieldably holding each of said inertia members in a position from which it is movable a critical distance in response to a predetermined applied force, means for adjusting the yielding force holding each of said members in said position, said means being so calibrated that the attained acceleration may be readily computed and so set that the inertia members will each respond to a different applied force, a circuit controlling means for each of said inertia members responsive to the critical movement thereof, a plurality of circuit interrupting means having different operating frequencies, means for producing a sustained signal having a pitch dependent upon the frequency of the actuating current, a supply source of electric current, conductive means connecting said sound reproducing device to said supply source through each of said circuit controlling means and the contacts of its respective circuit interrupter so that through the use of a plurality of elements the acceleration may be classified according to the pitch of the audible signal.

5. An acceleration indicating device comprising a plurality of inertia actuated elements each movable in response to a different predetermined magnitude of acceleration, a circuit controlling means for each element operated by the movement thereof, a variable current supply source for obtaining varying currents of different frequencies, means for indicating the frequency of the current variation, conductive means for connecting the indicating means to the variable frequency supply source through each circuit controlling means so that different frequency currents flow in said conductive means upon the operation of said circuit controlling means whereby the attained acceleration may be classified according to the frequency indications of the current variations in said conductive means.

6. In combination, a multiple element classifying accelerometer comprising a plurality of acceleration sensitive elements, a plurality of electric contact means each of which is controlled by one of the accelerometer elements, a plurality of electrical supply sources each having a distinctive frequency, detecting means sensitively responsive to the several electric supply frequencies, connecting means between the said accelerometer controlled contacts, the supply frequencies and the detecting means, whereby the characteristics of an impressed or forcing acceleration may be sensitively determined according to changes in the characteristics of the frequencies transmitted to the detecting means.

7. An acceleration indicating device comprising a plurality of inertia actuated elements each movable in response to a different predetermined magnitude of acceleration, a circuit controlling means for each individual element operated by the movement thereof, a multifrequency variable current supply source, separate circuits connecting each controlling means to said supply source so that upon movement of each element operating the circuit controlling means the current variations in each of said circuits will be of different frequencies and means for indicating the frequency of the current varitions in each circuit, whereby through the use of a plurality of elements the attained acceleration may be classified according to the frequency indications.

8. A contact accelerometer comprising a base member, a hollow cylindrical body mounted on said base, a cylindrical inertia member supported and guided by said body member so as to have a critical axial movement relative thereto, a spring forcing against said inertia member, a contact carried by said inertia member and movable therewith, a contact carried by said body, the contacts being positioned so that they may be brought into current conductive engagement upon the critical axial movement of said inertia member, means for obtaining a delicate precise adjustment of the spacing of said contacts to change the critical movement of said inertia member in order that its movement in response to parasitic vibrations will not affect the circuit controlled by said contacts, means for adjusting the force of said spring without changing the space between contacts, said means being calibrated so that the force required to move the inertia member against the action of said spring may be readily computed in units of acceleration and frequency sensitive means for detecting the critical movement of said inertia member.

9. The invention defined in claim 8 characterized by the fact that the last named means includes an electromagnetic means for producing a sustained audible signal of a pitch equivalent to the frequency of the current variations in the circuit in which it is connected, a circuit interrupter, an electrical power supply source and means for connecting the signal producing means to said power supply source in series with the said contacts and the circuit interrupter whereby a sustained audible signal of a pitch equivalent to the frequency of the circuit interrupter will be produced in said means when the contacts are closed.

10. In a device for indicating the attainment of a predetermined acceleration a circuit closer comprising two normally spaced contacts, means for adjustably setting the spacing between said contacts, a movable inertia member, a guide support therefor having a base, yieldable means for forcing said inertia member to a rest position from which it is movable in a direction against the force of said yieldable means in response to the attainment of a predetermined forcing acceleration, the force of said yieldable means being variable in accordance with the position of said member relative to said base, operative means connecting said inertia member to one of said contacts to move said contact into conductive engagement with said other contact upon movement of said member in the direction against said applied force, positioning means for holding said member in its rest position against the force of said yieldable means, and means for adjusting said positioning means relative to said base which will maintain the set spacing between said contacts.

11. A classifying accelerometer comprising an inertia responsive member, yieldable means forcing said member to a position from which it is movable against the action of the said yieldable forcing means through a critical distance when subjected to impressed accelerations having a magnitude greater than a predetermined minimum value, a circuit closure having a pair of normally spaced and relatively movable contacts, means responsive to the movement of said inertia member through said critical distance for effecting engagement of said contacts, means for obtaining an adjustment of said critical distance whereby the movements of said member in response in parasitic vibrations of relatively high frequency will be less than said critical distance, means for adjusting the said yieldable means without affecting the adjustment of the said critical distance to vary the said predetermined minimum value of acceleration response, a supply source of electric current varying at an audible frequency, and means connected to said supply source through said contacts and actuated by the current variations therein upon engagement of said contacts for translating said current variations into sensorially detectable vibrations controlled by said current variations and having the characteristics of an audible note.

12. A classifying accelerometer comprising a plurality of inertia actuated members, each of said members being adjustably set to respond to successive predetermined increments in magnitude of forcing acceleration, each of said members being movable through a critical distance when rendered responsive, means for obtaining adjustment of said critical distances through which each of said members is movable so that their movements in response to parasitic vibrations will be less than their said individual critical distances, means for adjusting the successive increments in magnitude of acceleration to which said elements respond without changing said critical adjustment of the distance through which each element must move to be rendered responsive, and means for producing a sustained audible signal the pitch of which successively changes in response to the attainment of the successive predetermined increments in magnitude of impressed acceleration.

13. A detecting system for use with a classifying accelerometer having a plurality of inertia sensitive elements each movable a critical distance in response to a different predetermined minimum value of forcing acceleration, a pair of normally spaced and relatively movable electrical contacts for each inertia member, and means responsive to the movement of each inertia member for effecting engagement of its corresponding contacts; said detecting system including a source of electrical current having variable distinctive frequencies within the audible range, means actuated by said current variations for translating the said current variations into sensorially detectable vibrations having the characteristics of an audible note, and circuit means controlled by the engagement of each pair of contacts for controlling the energization frequency of the current actuated means whereby successive engagement of said contacts produces successive changes in the sensory response produced by said means.

JAMES A. BUCHANAN.